K. VON KANDO.
APPARATUS FOR PROTECTING ELECTRIC CIRCUITS.
APPLICATION FILED DEC. 9, 1914.
1,246,686.
Patented Nov. 13, 1917.
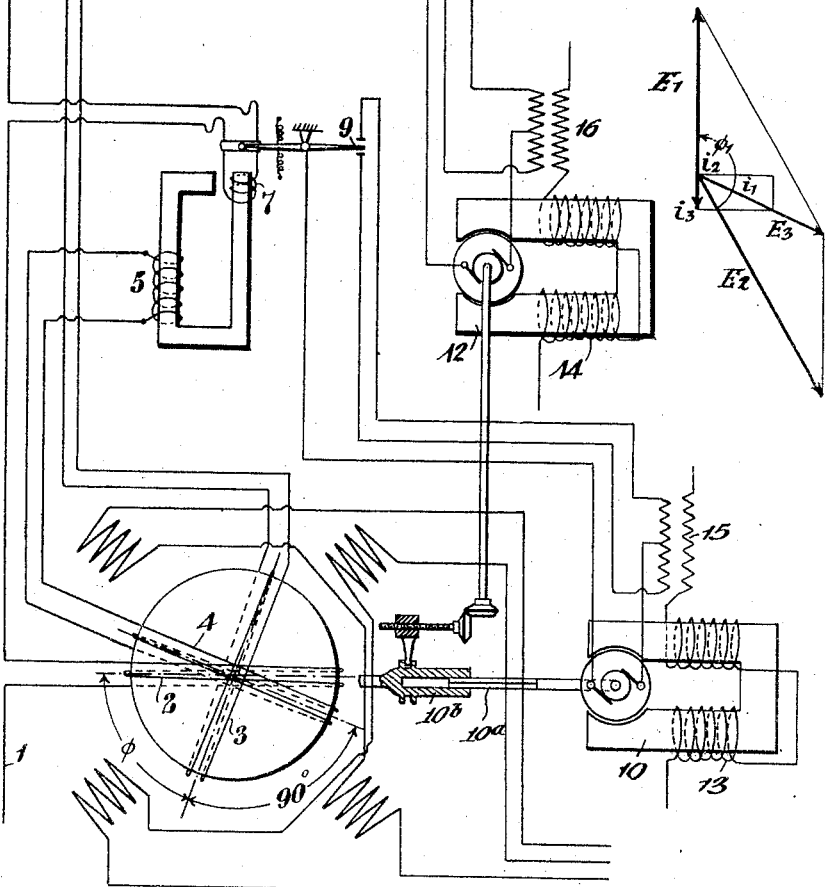

UNITED STATES PATENT OFFICE.

KALMAN von KANDO, OF VADO LIGURE, ITALY, ASSIGNOR TO WESTINGHOUSE ELECTRIC & MANUFACTURING COMPANY, OF EAST PITTSBURGH, PENNSYLVANIA, A CORPORATION OF PENNSYLVANIA.

APPARATUS FOR PROTECTING ELECTRIC CIRCUITS.

1,246,686.     Specification of Letters Patent.     Patented Nov. 13, 1917.

Application filed December 9, 1914. Serial No. 876,383.

*To all whom it may concern:*

Be it known that I, KALMAN VON KANDO, a subject of the Emperor of Austria and of the King of Hungary, and a resident of Vado Ligure, in the Kingdom of Italy, have invented a new and useful Improvement in Apparatus for Protecting Electric Circuits, of which the following is a specification.

This invention relates to the protection of electric circuits and has for its object to provide an improved arrangement by means of which the influence of alternating currents on neighboring electric circuits (hereafter simply called circuits) is eliminated.

This influence might be either an inductive phenomenon, when the circuits are insulated from each other, or it might be due to stray currents as in the case when the circuits have portions in common, for instance when the earth is used as the return-conductor of the alternating current and the circuit to be protected is also connected to the ground.

The principle underlying the present invention consists in protecting the circuit by means of a variable E. M. F. which is always exactly or approximately opposite in phase and exactly or approximately of the same magnitude as the E. M. F. which is induced in the circuit by the disturbing alternating current or is produced by the disturbing current flowing through the common part of the two circuits or is a resultant of these currents.

This protecting E. M. F. is generated by induction in a coil which is inserted in the circuit to be protected, this coil being located in a revolving magnetic field and turned and moved therein so that the proper phase and magnitude of the required E. M. F. is obtained.

In the accompanying drawings Figure 1 is a diagram of electrical apparatus and connections illustrating one method of carrying out my invention and Fig. 2 is a vector diagram hereinafter explained.

Referring now to Fig. 1, in the circuit 1, 1 which is to be protected there is inserted a coil 2 that is mechanically connected to two other coils 3 and 4. In practice the three coils 2, 3 and 4 may be wound on a common iron core. These three coils are located in a rotating magnetic field the specific arrangement of which need not be described in detail, since it can be similar to the revolving field of a polyphase induction motor, as shown, or magnets may be synchronously revolved around, inside or outside the stationary coils 2, 3 and 4, or the coils 2, 3 and 4 may be attached to a synchronous motor and revolved inside a stationary magnetic field.

In every case the revolving magnetic field is produced by alternating currents which have the same frequency and are in exact synchronism with the alternating current which influences the circuit which is to be protected. One way of attaining this is to connect the coils which produce the revolving field to the same circuit that carries the current which influences the circuit to be protected.

In the circuit of the coils 3 and 4 are connected the electromagnets 6 and 5. Assuming that the revolving field revolves in clockwise direction and that the lag of current with respect to the induced E. M. F. in the circuit of coil 2 is $\varphi$; then by placing the coil 3 at an angle equal to $\varphi$ in front of coil 2 with respect to the direction of the revolving field it can easily be seen that the current in the coil 3, and the magnetic field produced by it in the magnet 6, will be in phase with the E. M. F. induced in the coil 2.

If the constants of the circuit of coil 4 are the same as those of coil 3, then by placing coil 4 at right-angles with coil 3 (assuming a two pole revolving field) the field produced by the coil 4 in the magnet 5 will have a phase displacement of 90° with reference to the current in the coil 3, that is in regard to the E. M. F. induced in the coil 2.

In the magnetic field produced by the coils 5 and 6 are placed the moving coils 7 and 8 connected in series with the circuit 1, 1 which is to be protected. Since the frequency of the pulsating magnetic fields severally generated by the coils 5 and 6 is the same as the one of the alternating currents interfering with the circuit 1—1, there will be an electromagnetic interaction between these pulsating magnetic fields and the coils 7 and 8 in such a way that the latter will be impelled to move in one direction or the other according to the phase and direction of the currents flowing through them.

In the vector diagram of Fig. 2, in which electromotive forces and currents are indicated in accordance with the usual conventions, let $E_1$ be the E. M. F. induced in the coil 2, and $E_2$ the resultant of all the E. M. F.'s which interfere with the circuit 1—1 and against which the latter is to be protected; then $E_3$ is the resultant E. M. F. in the circuit 1—1, which actually produces the interfering currents. It is evident that in order to protect the circuit 1, 1 against these currents, it is sufficient to suppress the resultant E. M. F. $E_3$ which can be done by giving to the artificially induced E. M. F. $E_1$ the proper magnitude and by making its phase exactly opposite to that of $E_2$ i. e. by making the value of $E_1$ equal to the value of $E_2$ and the angle $\varphi_1 = 180°$.

Assume first that the self induction of the circuit 1, 1 with reference to its ohmic resistance can be neglected. In this case the current $i_1$ produced by the E. M. F. $E_3$ is in phase with said E. M. F. The current $i_1$ can be resolved into two components $i_2$ and $i_3$ one of which $i_2$ is at right angles to $E_1$ and the other $i_3$ is in phase with $E_1$.

The component $i_2$ flowing through the coil 7 placed in the field of the magnet 5, will produce a force which moves the coil 7 in one direction or the other according to the sign of the current. This motion is transmitted through a lever to the contactor 9 by means of which a motor 10 will be connected to the circuit and set in rotation either in one direction or the other. The method of starting and reversing the motor will be hereinafter described. The motor 10 is provided with a square shaft $10^a$ which slidingly engages a sleeve $10^b$ that is secured to the core support of the coils 2, 3 and 4. The motor 10 rotates in such a way as to rotate it in one direction or the other with respect to the direction of rotation of the revolving magnetic field. As long as the coil 7 is traversed by the positive current component $i_2$, the contact at 9 is arranged to cause the motor 10 to rotate the coils 2, 3 and 4 so as to increase the angle $\varphi_1$. When the component $i_2$ has a negative value, the direction of the force acting on the coil 7 is reversed, the contact 9 is closed on the other side and the direction of rotation of the motor 10 reversed. The coils 2, 3 and 4 will be rotated in the other direction and the angle $\varphi_1$ is decreased. It will readily be seen that the motor 10 will run as long as there is the current component $i_2$ and will stop only when this component is zero i. e. when the angle $\varphi_1$ is equal to 180°.

The current component $i_3$ produces a pull on the coil 8 which, transmitted to the contactor 11, starts up the motor 12 either in one direction or the other. This motor also acts on the support of the coils 2, 3 and 4 but moves it axially in or out of the revolving field but without changing its angular position. As long as $i_3$ is opposite in phase to $E_1$ the coils 2, 3 and 4 are pushed into the revolving field hence the E. M. F. $E_1$ is increased; when on the other hand the component $i_3$ is in phase with the E. M. F. $E_1$, the coil 8 reverses the motor 12 and the coils 2, 3 and 4 are pulled out from the revolving field hence the E. M. F. $E_1$ is decreased. Evidently this mechanism will come to rest only when $i_3$ is zero i. e. when $E_1$ is equal to $E_2$.

The mechanical connection between the motors 10 and 12 and between the support of the coils 2, 3 and 4 may be effected in any suitable manner and requires no explanation.

It has been assumed that the self induction of circuit 1—1 with reference to its ohmic resistance can be neglected; if this assumption is incorrect and the phase displacement between $E_3$ and $i_1$ is not negligible, the influence of this phase displacement can be eliminated by a proper setting of the coil 2 with reference to the coil 3 i. e. by a proper choice of the angle $\varphi$.

It will be seen that, whatever may be the magnitude and phase of the disturbing E. M. F. $E_2$, the described apparatus will make it possible, within the limits of sensibility of the coils 7 and 8 and within the capacity of the coil 2, to produce automatically a protecting E. M. F. $E_1$, which is always equal and opposite in phase to $E_2$ so that the resultant E. M. F. $E_3$ and with it the current $i_1$ will be zero, or of such a small value that it will not act any more as a disturbing factor on the circuit 1—1.

Although not relating to the principle of this invention the method of starting and reversing the motors 10 and 12 is an important constructional detail and may be briefly described as follows: The motors are supplied with alternating current. Connected in series with the field coils 13 and 14 are transformers 15 and 16; the two secondary terminals of these transformers are connected to contacts 9 and 11 respectively, while intermediate taps, taken off at the middle points of the transformers, are connected to the armatures of the motors 10 and 12 and thence to the contacts 9 and 11. It is evident that when the contact 9 or the contact 11 closes the circuit on one side, the voltage of one half or the other of the secondary winding of the transformer 15 or the transformer 16 is applied to the armature of the motor 10 or the motor 12. The motors 10 and 12 are consequently caused to rotate in one of the reverse directions. With this arrangement the motors will start with a fairly high torque and the voltages and currents necessary for starting and reversing being, however, maintained within fairly small limits.

What I claim is:—

1. The combination with a circuit to be protected from the influence of alternating currents obtaining in an adjacent circuit, of means for producing a magnetic field from alternating currents having the same phase and frequency as said disturbing alternating currents, a coil connected in the circuit to be protected and located in said magnetic field, and means for automatically varying the position of said coil in said magnetic field whereby the value and the phase of the electromotive force induced in said coil may be independently controlled.

2. The combination with a circuit to be protected from the influence of alternating currents, of means for producing a magnetic field of the same phase and frequency as said alternating currents, a protective coil connected in said circuit and located in said magnetic field, a second coil also located in said magnetic field and mechanically connected with said protective coil, a third coil mechanically connected with the other said coil, means for rotating said coils in the magnetic field, and means for moving said coils in and out of said magnetic field.

3. The combination with a circuit to be protected from the influence of alternating currents, of means for producing a magnetic field of the same phase and frequency as said alternating currents, a protective coil connected in said circuit and located in said magnetic field, a second coil also located in said magnetic field and mechanically connected to said protective coil at an angle which is equal to the lag of the current in said second coil with respect to the E. M. F. induced therein by the magnetic field, a third coil mechanically connected with the other said coils and at an angle with the second coil such that the current in said third coil has a phase displacement of ninety degrees with regard to the current in said second coil, means for rotating said coil in the magnetic field and means for moving said coils in and out of said magnetic field.

4. The combination with a circuit to be protected from the influence of alternating currents, of a protective coil connected in said circuit, a second coil mechanically connected with said protective coil, a relay influenced by the current in said second coil, a third coil mechanically connected with both said coils, a relay influenced by current in said third coil and electric motors operatively connected with said coils and respectively controlled by said relays.

5. The combination with an electric circuit, of a coil in said circuit located in a magnetic field, a second coil mechanically connected with said coil and located in the same magnetic field, a third coil mechanically connected with both said coils and located in the same magnetic field, relays influenced by the current in coils connected in series with the circuit to be protected coöperating with coils respectively in series with said second and third coils and electric motors controlled by said relays.

6. The combination with an electric circuit, of a coil in said circuit mounted on a rotatable core, a second coil mounted on said core, a relay influenced by the current in said second coil, a third coil mounted on the said core, a relay influenced by the current in said third coil and electric motors controlled by said relays, one of said motors being adapted to rotate the said core and coils and the other to move said core and coils parallel to the axis of rotation.

In testimony whereof I have hereunto subscribed my name this 28th day of October, 1914.

KALMAN von KANDO.

Witnesses:
C. A. SERRARI,
H. BORAGAIN.

Copies of this patent may be obtained for five cents each, by addressing the "Commissioner of Patents Washington, D. C."